United States Patent Office 3,297,578
Patented Jan. 10, 1967

3,297,578
BLEACHING, STERILIZING, DISINFECTING, AND DETERGING COMPOSITIONS
Marvin M. Crutchfield and Riyad R. Irani, St. Louis, Mo., assignors to Monsanto Company, St. Louis, Mo., a corporation of Delaware
No Drawing. Filed Aug. 20, 1965, Ser. No. 481,426
17 Claims. (Cl. 252—99)

This is a continuation-in-part of application Serial No. 297,949, filed July 26, 1963, now abandoned.

The present invention pertains to a method for imparting sequestering capabilities to a chlorine-releasing agent and to the use of said agent in bleaching, sterilizing, disinfecting, and deterging compositions and to the resulting compositions.

Since bleaching, sterilizing, disinfecting, and deterging compositions are customarily used in aqueous systems where oftentimes the water is hard or contaminated, certain alkaline earth metal ions, such as calcium and magnesium, and heavy metal ions, such as iron, copper and the like can oftentimes be particularly troublesome in most of the foregoing applications. In addition, when using a chlorine-releasing agent in most of the foregoing applications, certain metallic ions, such as, nickel, copper, cobalt, aluminum and iron oftentimes interfere with the action of the agent and cause the agent to be less effective and sometimes essentially non-effective. Therefore, the use of sequestering or chelating agents should be extremely well-suited for use with chlorine-releasing agents in the foregoing applications in order to prevent or minimize the effects of such ions. Heretofore, however, it has not been possible to find a truly effective and compatible organic sequestering agent for use with the chlorine-releasing agents. In general, the widely used organic agents of the polyamino carboxylic acid type and hydroxy substituted carboxylic acid type are oxidized and thus lose their sequestering ability in the presence of chlorine-releasing agents while degrading the chlorine-releasing agents and thus limiting their effectiveness. In addition, since oftentimes the use of chlorine-releasing agents in the foregoing applications are conducted in water at relatively high temperatures and/or relatively high pH conditions it is also preferred that the sequestering agent be stable and effective under such conditions, that is to say, be "hydrolytically stable" as defined hereinafter. As can be appreciated, therefore, a method for imparting sequestering capabilities to a chlorine-releasing agent in aqueous media by the use of a "hydrolytically stable" sequestering agent which is effective in the presence of a chlorine-releasing agent would represent an important advancement in this art.

An object of this invention is to provide a method for imparting sequestering capabilities to a chlorine-releasing agent in aqueous media.

Another object of this invention is to provide a method for stabilizing a chlorine-releasing agent in aqueous media against ions which interfere with the action of the agent.

A still further object of this invention is to provide bleaching, sterilizing, disinfecting and deterging compositions which have incorporated therein a chlorine-releasing agent and a sequestering agent which is effective in the presence of the chlorine-releasing agent.

Other objects will become apparent from the detailed description and the claims.

It has been found that alkylenediphosphonic acids, the salts thereof, or mixtures of the acids and/or salts, said acids being of the following formula:

(I)

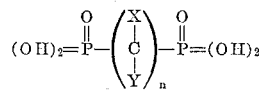

wherein $n$ is an integer from 1–10, X represents hydrogen or lower alkyl (1–4 carbon atoms) and Y represents hydrogen, hydroxyl or lower alkyl (1–4 carbon atoms), are effective in imparting sequestering capabilities to chlorine-releasing agent in aqueous media as will be more fully discussed hereinafter.

Compounds illustrative of alkylenediphosphonic acids include the following:

(1) Methylenediphosphonic acid,
   $(OH)_2(O)PCH_2P(O)(OH)_2$
(2) Ethylidenediphosphonic acid,
   $(OH)_2(O)PCH(CH_3)P(O)(OH)_2$
(3) Isopropylidenediphosphonic acid,
   $(OH)_2(O)PC(CH_2CH_3)P(O)(OH)_2$
(4) 1-hydroxy, ethylidenediphosphonic acid,
   $(OH)_2(O)PC(OH)(CH_3)P(O)(OH)_2$
(5) Hexamethylenediphosphonic acid,
   $(OH)_2(O)PCH_2(CH_2)_4CH_2P(O)(OH)_2$
(6) Trimethylenediphosphonic acid,
   $(OH)_2(O)P(CH_2)_3P(O)(OH)_2$
(7) Decamethylenediphosphonic acid,
   $(OH)_2(O)P(CH_2)_{10}P(O)(OH)_2$
(8) 1-hydroxy, propylidenediphosphonic acid,
   $(OH)_2(O)PC(OH)(CH_2CH_3)P(O)(OH)_2$
(9) 1,6-dihydroxy, 1,6 - dimethyl, hexamethylenediphosphonic acid
   $(OH)_2(O)PC(CH_3)(OH)$
   $\qquad (CH_2)_4C(CH_3)(OH)P(O)(OH)_2$
(10) 1,4-dihydroxy, 1,4 - diethyl, tetramethylenediphosphonic acid,
   $(OH)_2(O)PC(C_2H_5)(OH)$
   $\qquad (CH_2)_2C(C_2H_5)(OH)P(O)(OH)_2$
(11) 1,3 - dihydroxy, 1,3 - dipropyl, trimethylenediphosphonic acid,
   $(OH)_2(O)PC(C_3H_7)(OH)$
   $\qquad (CH_2)C(C_3H_7)(OH)P(O)(OH)_2$
(12) 1,4-dibutyl, tetramethylenediphosphonic acid,
   $(OH)_2(O)PCH(C_4H_9)(CH_2)_2CH(C_4H_9)P(O)(OH)_2$
(13) Dihydroxy, diethyl, ethylenediphosphonic acid,
   $(OH)_2(O)PC(OH)(C_2H_5)C(OH)(C_2H_5)P(O)(OH)_2$
(14) Tetrabutyl, butylenediphosphonic acid,
   $(OH)_2(O)P[CH(C_4H_9)]_4P(O)(OH)_2$
(15) 4-hydroxy, 6-ethyl, hexamethylenediphosphonic acid
   $(OH)_2(O)PCH_2CH_2CH_2CH(OH)$
   $\qquad CH_2CH(C_2H_5)P(O)(OH)_2$ Alkylenediphophonic acids and their salts may be prepared by various means, one of which comprises as a first step the preparation of the corresponding ester by the following general reactions:

(1) For the alkylidenediphosphonic acids and their salts where $n > 1$.

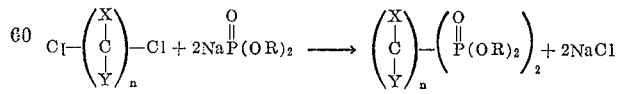

(2) For the alkylidenediphosphonic acids and their salts where $n = 1$.

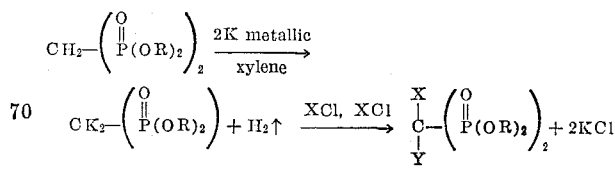

(3) For the alkylenediphosphonic acids and their salts

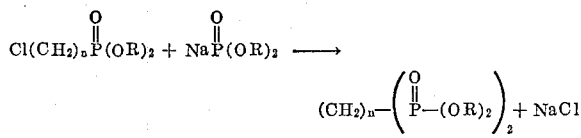

(4) For the 1 hydroxy, alkylenediphosphonic acids and their salts.

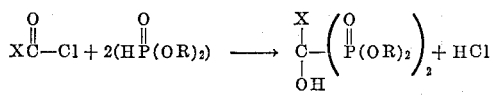

wherein $n$, X and Y are the same as in the foregoing general formula and R represents an alkyl group.

The free alkylenediphosphonic acids and their salts may be prepared by hydrolysis of the ester using strong mineral acids such as hydrochloric acid and the like.

The lower alkylidenediphosphonic acids and the water-soluble salts thereof, said acids being of the following formula:

(II)

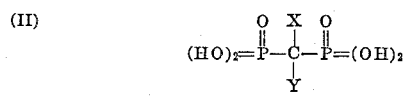

wherein X represents hydrogen or lower alkyl (1–4 carbon atoms) and Y represents hydrogen, hydroxyl or lower alkyl (1–4 carbon atoms), are preferred in the present invention.

Compounds illustrative of lower alkylidenediphosphonic acids include the following:

(1) Methylenediphosphonic acid, $CH_2[P(O)(OH)_2]_2$
(2) Ethylidenediphosphonic acid, $CH_3CH[P(O)(OH)_2]_2$
(3) Isopropylidenediphosponic acid, $(CH_3)_2C[P(O)(OH)_2]_2$
(4) 1-hydroxy, ethylidenediphosphonic acid, $CH_3C(OH)[P(O)(OH)_2]_2$
(5) 1-hydroxy, butylidenediphosphonic acid, $CH_3CH_2CH_2C(OH)[P(O)(OH)_2]_2$
(6) Butylidenediphosphonic acid, $CH_3CH_2CH_2CH[P(O)(OH)_2]_2$ Although in general, any water-soluble salt of the alkylenediphosphonic acids may be employed, the alkali metal salts are preferred, and, in particular, the sodium salts such as the di-, tri- and tetrasodium salt; however, other alkali metal salts, such as potassium, lithium, and the like, as well as mixtures of the alkali metal salts, may be substituted therefor. In addition, any water-soluble salt, as well as mixtures of water-soluble salts, such as the ammonium salts and the amine salts, which exhibit the characteristics of the alkali metal salts may be used to practice the invention. In particular, amine salts prepared from low molecular weight amines, i.e., having a molecular weight below about 300, and more particularly the alkyl amines, alkylene amines and alkanol amines containing not more than 2 amine groups, such as, ethyl amine, diethylamine, propylamine, propylenediamine, hexylamine, 2-ethyl hexylamine, N-butylethanol amine, triethanol amine and the like, are the preferred amine salts.

The chlorine-releasing agents which are suitable for use in the instant invention are those water-soluble organic and inorganic compounds which are believed to have oxidizing power by virtue of containing "available-chlorine" which can react in aqueous solution to form hypochlorous acid or the hypochlorite ion. Such organic compounds include the alkyl hypochlorites and especially the lower alkyl hypochlorites, such as ethyl hypochlorite, propyl hypochlorite, n-butyl hypochlorite and tert-butyl hypochlorite; the N-chlorinated heterocyclic compounds and especially the five and six membered N-chlorinated heterocyclic compounds, such as, hydantoin, N-chlorosuccinimide and the triazines, such as, the cyanuric acids and salts which include trichloroisocyanuric acid, dichloroisocyanuric acid, sodium dichloroisocyanurate, and potassium dichloroisocyanurate, as well as melamine, ammeline and ammelide; and the N-chloro aromatic and substituted aromatic sulfonamides, such as, sodium benzenesulfochloroamide, sodium nitrobenzenesulfochloroamide and sodium p-toluenesulfonchloroamide. Such inorganic compounds include the alkali metal chlorine containing compounds, such as, sodium hypochlorite, sodium chlorite and lithium hypochlorite, the alkaline earth metal chlorine containing compounds, such as calcium hypochlorite and barium hypochlorite, and the "chlorinated trisodium phosphates," a class of compounds which consist of physico-chemical combination in unitary crystalline form of trisodium phosphate and sodium hypochlorite. The "chlorinated trisodium phosphates" are known and are described along with their methods of preparation, in United States Letters Patent, 1,555,474 or 1,965,304.

The term "active" or "available" chlorine is commonly used in the hypochlorite bleaching and sterilizing art to refer to atomic or "nascent" chlorine. Such chlorine differs from normally occurring chlorine in that the latter occurs in molecular form and each molecule contains two atoms of chlorine. When employed for bleaching purposes the "active" or "available" chlorine has twice the oxidizing or bleaching activity or molecular chlorine based on the weight (molecular) of the normally occurring molecular chlorine. Thus, the terms "active" or "available" chlorine are generally expressed as twice the amount in terms of percent of the chlorine present in a molecule of material.

Due to the many and varied chlorine-releasing agents which vary in molecular weight and available chlorine over a wide range and the fact that the amounts of the chlorine-releasing agent used in many applications are based on the available chlorine content, the amounts suitable for use herein unless otherwise indicated will be based on percent available chlorine per total weight of the particular composition. By knowing the molecular weight of the particular chlorine-releasing agent, its available chlorine, and the available chlorine desired expressed in percent available chlorine per total weight of the particular composition, the necessary amounts on a weight bases can readily be determined.

The sequestering agents representative of the instant invention may be incorporated in a liquid chlorine-releasing agent in order to impart sequestering capabilities thereto, such as, a 5% solution of hypochlorite bleach, which is usually further diluted to from about .01 to 1% bleach solution when used as a household bleach. In addition, because the sequestering agent has a high degree of stability when incorporated in dry bleach compositions, such as the chlorinated cyanuric acids and salts and the chlorinated trisodium phosphates, it can, therefore, be admixed with dry bleaches and the resulting composition dissolved in the aqueous system immediately preceding its end use application. Because of the many advantages derived from dry bleach compositions, it is therefore preferred that the sequestering agent be admixed with the dry chlorine-releasing agent. In any event, the sequestering agent is intended to be used with the chlorine-releasing agent in an aqueous system for such end use applications as bleaching, sterilizing, disinfecting and cleansing.

The proportions of the chlorine-releasing agent to sequestering agent may be varied over a wide range depending upon the available chlorine desired and also the application involved. Usually proportions of the chlorine-releasing agent to sequestering agent of between about 1:50 to about 5,000:1 on a percent available chlorine to weight of sequestering agent basis are preferred. In general, for most end use applications the amount of sequestering agent necessary is usually between about 0.01 to 2% by weight of the aqueous solution and the usual available chlorine may vary from about 0.001 to 0.05% available chlorine per weight of aqueous solution.

In accordance with the present invention, novel compositions of matter having oxidizing, bleaching, detergent and disinfecting properties may be prepared by admixing the chlorine-releasing agent and the sequestering agent with inorganic phosphates such as the alkali metal (especially sodium and potassium) tripolyphosphates, pyrophosphates, orthophosphates, (i.e., mono-, di- and trisodium orthophosphates) and mixtures of these and inert additives such as the alkali metal (especially sodium and potassium) carbonates, borates, silicates, metasilicates, sulfates, chlorides and mixtures of these. In addition to the foregoing, wetting agents, synthetic surfactants, especially anionic surfactants such as the alkali metal salts of organic sulfonates or sulfates containing an alkyl group of from about 8 to 22 carbon atoms, particularly the sodium salts, such as alkyl aryl sulfonates (sodium dodecyl benzene sulfonate), sulfates of primary alcohols (sodium lauryl sulfate) and the like, soaps, fillers, abrasives (such as silica or feldspar, may be incorporated in the composition usually in minor amounts (i.e., less than 50% by weight of the composition) to impart special properties.

By the term "hydrolytically stable" sequestering agent, as used herein, is meant a substantial resistance by the sequestering agent to hydrolysis or degradation under various pH and temperature conditions. For example, a 20 gram sample of methylenediphosphonic acid, $$CH_2[P(O)(OH)_2]_2$$

was dissolved in 100 ml. of water. A 25 ml. portion of the solution was added to a 25 ml. portion of 12 M HCl to give a 10% solution of the agent in HCl. Another 25 ml. portion of the solution was added to a 25 ml. portion of 10% NaOH to give a 10% solution of the sequestering agent in a 5% solution of NaOH. The foregoing 10% solutions were boiled for a period of four hours, at the end of which both solutions exhibited no change in physical properties. Nuclear magnetic resonance spectra showed the two 10% solutions to be identical with a fresh unheated 10% solution of the sequestering agent in water at the same acid and alkaline conditions, thereby establishing the resistance of the sequestering agent to hydrolysis or degradation under severe temperature and pH conditions. It should be noted that all known polyphosphates, whether in the acid, salt or ester form, would substantially hydrolyze or degrade under the foregoing conditions. Another sample, in this instance 2 grams of tetrasodium methylenediphosphonate, a dry powder, was heated on a thermogravimetric balance. Below a temperature of 300° C. less than 1% weight loss resulted. X-ray diffraction patterns of the heated sample and an unheated sample were identical. As is believed apparent from the foregoing, the sequestering agent of the instant invention is "hydrolytically stable" and by being effective for sequestering or chelating purposes in the presence of a chlorine-releasing agent in an aqueous medium can advantageously be used in many various bleaching, sterilizing, disinfecting and deterging applications.

In order to illustrate the relative stability of various organic sequestering agents which are effective in the alkaline pH region, i.e., about 8–11, and a sequestering agent representative of the instant invention in aqueous solutions containing chlorine releasing agents, the following tests and comparisons were made with the indicated results. The tests were carried out in relatively concentrated solutions containing 3% by weight of both sequestering agent and sodium hypochlorite at pH 10 and 25° C. The measurements were made of percent original sequestering power remaining after about 75 minutes and percent original available chlorine remaining after 3 hours with the hypochlorite determined iodometrically by thiosulfate titration and sequestering ability by titration with $Ca(NO_3)_2$ in 2.5% NaOH solution to the appearance of a permanent precipitate.

The following table indicates the results of the above comparison:

TABLE 1

| Sequestering Agent | Original Sequestering Power Remaining (percent) | Original Hypochlorite Remaining (percent) |
| --- | --- | --- |
| (1) Disodium ethylene diamine tetraacetate.2H²O | 18.0 | .7 |
| (2) Trisodium nitrilo triacetate.H²O | 17.5 | .7 |
| (3) Sodium gluconate | 28.0 | <4.5 |
| (4) Tetrasodium methylenediphosphonate | 98.5 | 96.0 |

As can be observed from the above table the widely-used organic sequestering agents (1), (2) and (3), would not be considered suitable in many applications for use with a chlorine-releasing agent since less than 30% of the original sequestering ability remained after about 75 minutes in the presence of sodium hypochlorite and less than 4.5% original hypochlorite remained after 3 hours in the presence of the sequestering agents. However, the sequestering agent of the instant invention, (4), retained more than 98% of its original sequestering ability after 75 minutes in the presence of sodium hypochlorite and more than 96% of the hypochlorite remained after 3 hours in the presence of the sequestering agent. This dramatically illustrates the unique and totally unexpected compatibility between a sequestering agent representative of the instant invention and a chlorine-releasing agent of the instant invention.

In order to illustrate the relative stability of various sequestering agents representative of the instant invention in the presence of widely used chlorine-releasing agents; sodium hypochlorite and potassium dichloroisocyanurate, the following tests and comparisons were made with the indicated results. The tests were carried out in relatively concentrated solutions containing in one instance 3% by weight of the sequestering agent and 3% by weight of sodium hypochlorite, and in the other instance, 3% by weight of the sequestering agent and about 4% by weight of potassium dichloroisocyanurate. The comparisons were made at pH 10 and 25° C. with the measurements of percent original available chlorine remaining after 8 hours being determined iodometrically by thiosulfate titration.

The following table indicates the results of the above comparisons:

TABLE 2

| Sequestering Agent | Original Chlorine-releasing Agent Remaining (percent) | |
| --- | --- | --- |
|  | A* | B* |
| (1) Tetrasodium methylene diphosphonate | 98.6 | 76.2 |
| (2) Tetrasodium 1-hydroxy, ethylidene diphosphonate | 92.0 | 30.4 |

A*—Sodium hypochlorite.
B*—Potassium dichloroisocyanurate.

As can be observed from the above table, sequestering agents representative of the instant invention are especially well-suited for use with and compatible with chlorine-releasing agents representative of the instant invention; namely, sodium hypochlorite and potassium dichloroisocyanurate. As shown, the sequestering agents did not materially affect the chlorine-releasing agents in relatively concentrated solutions during a period of about 8 hours.

In order to illustrate the sequestering ability of the lower alkylidenediphosphonic acids and their salts, the following tests and comparisons were made with the indicated results. The testing procedure used unless otherwise indicated consisted of pipetting an aliquot volume of 2.5% stock ferric chloride solution into a beaker and adding thereto enough sodium hydroxide or hydrochloric acid to give the desired pH. The solution was stirred for 15 minutes, followed by the addition of an aliquot of 2.5% sequestering agent solution. After final pH adjustment with sodium hydroxide or hydrochloric acid, the solution was shaken for 48 hours to reach equilibrium. The solution was centrifuged at 11,500 r.p.m. for 90 minutes to remove colloidal $Fe(OH)_3$ and an aliquot of the supernatant solution was titrated iodometrically or analyzed by X-ray fluorescence with use of an appropriate calibration curve in order to determine the ferric iron concentration. The ferric iron concentrations and sequestering agent concentrations found in p.p.m. were converted to a weight basis and expressed as pounds of iron ($Fe^{III}$) sequestered by 100 lbs. of the sequestering agent.

The following table illustrates the ability of representative sequestering agents of the instant invention to sequester $Fe^{III}$ effectively over a wide range of pH conditions.

TABLE 3

| pH | Pounds of Iron Sequestered by 100 Pounds of Sequestering Agent | |
|---|---|---|
| | A* | B* |
| 10.8 | 15.0 | 10.0 |
| 10.3 | 21.1 | 14.0 |
| 9.8 | 20.6 | 13.7 |
| 9.5 | 21.1 | 14.1 |
| 7.7 | 20.0 | 13.3 |
| 6.9 | 20.6 | 13.7 |
| 5.9 | 19.7 | 13.1 |
| 4.3 | 13.6 | 9.0 |

A*—Methylenediphosphonic acid.
B*—Tetrasodium methylenediphosphonate.

As can be observed from the above table the sequestering agents representative of the instant invention are quite effective over a wide pH range and in both acids and alkaline solution. It can, therefore, be appreciated that these sequestering agents are capable of being used with a chlorine-releasing agent in many and varied applications.

The following table compares other well known and widely used organic sequestering agents to a sequestering agent representative of the instant invention in sequestering $Fe^{III}$ over a wide range of pH conditions.

TABLE 4

| pH | Pounds of Iron Sequestered by 100 Pounds of Sequestering Agent | | | | |
|---|---|---|---|---|---|
| | A* | B* | C* | D* | E* |
| 11 | 6.75 | | .2 | 0 | 3.5 |
| 10.5 | 12.7 | 5.0 | .3 | 0 | 2.6 |
| 10 | 13.7 | 12.5 | .6 | .3 | 1.6 |
| 9.5 | 14.2 | 15.02 | 1.0 | 1.5 | 1.2 |
| 9 | 14.4 | 15.7 | 1.7 | 3.2 | 1.0 |
| 8 | 14.4 | 16.3 | 4.0 | 8.8 | 1.6 |
| 7 | 14.0 | 16.4 | 8.9 | 13.0 | 3.5 |
| 6 | 13.1 | 16.4 | 17.3 | 14.3 | 4.6 |
| 5 | 11.5 | 16.5 | 18.5 | 14.7 | 5.0 |

A*—Tetrasodium methylene diphosphonate.
B*—Disodium ethylenediamine tetraacetate. $2H_2O$.
C*—Trisodium nitrilo triacetate. $H_2O$.
D*—Sodium citrate.
E*—Potassium gluconate.

From the above table it can be observed that a sequestering agent representative of the instant invention, tetrasodium methylenediphosphonate, compares favorably with the widely used organic sequestering agents under comparison, and, also, the novel sequestering agent exhibits effectiveness over a wide range of pH conditions. This, of course, is highly advantageous in permitting its use with a chlorine-releasing agent in many and varied applications.

In addition, other metal ions capable of being sequestered by the sequestering agents of the instant invention include the alkaline earth metal ions, such as, calcium and magnesium, and the heavy metal ions, such as, aluminum, cobalt, nickel, manganese, copper, lead, titanium, chromium and the like.

As previously mentioned, certain metallic ions act as catalysts for the decomposition of chlorine-releasing agents in aqueous media. By the use of the sequestering agents of the instant invention an aqueous solution containing a chlorine-releasing agent may be stabilized against such ions which interfere with the action of the agent. Usually for stabilization, proportions of the sequestering agent to decomposing catalysts of between about 1:1 to about 100:1 on a weight basis are preferred although amounts of the sequestering agent in excess of this may be used in order to not only stabilize the aqueous solution containing the chlorine-releasing agent but also to impart sequestering capabilities thereto. In order to illustrate the stabilization which a sequestering agent of the instant invention imparts to an aqueous solution containing the chlorine-releasing agent, the following tests and comparisons were made with the indicated results. The tests were carried out in relatively concentrated solutions containing 5% by weight of both the sequestering agent and sodium hypochlorite at pH 9 and 65° C. One solution contained $Cu^{++}$ which is one of the more powerful catalysts for decomposing sodium hypochlorite. The measurements of percent original available chlorine remaining after the indicated times were determined iodometrically by thiosulfate titration. The following table indicates the results of the comparisons.

TABLE 5.—PERCENT OF ORIGINAL HYPOCHLORITE REMAINING UNDER ACCELERATED DECOMPOSITION CONDITIONS

| Time (hrs.) | Initial Solution Composition | |
|---|---|---|
| | A | B |
| 0 | 100 | 100 |
| 4 | 63 | 50 |
| 21 | 27 | 12 |

A—5% NaOCl, 5% tetrasodium methylenediphosphonate, 10 p.p.m. $Cu^{++}$.
B—5% NaOCl, 10 p.p.m. $Cu^{++}$.

As can be observed from the above table, the sequestering agent of the instant invention exhibited the ability to retard the rate of decomposition of sodium hypochlorite in an aqueous solution. After 21 hours, the results indicated that there was more than twice as much hypochlorite remaining in the solution containing the sequestering agent of the present invention than in the solution which did not contain such an additive. It should be noted that this test and comparison was made under accelerated decomposition conditions. In the hypochlorite art it is well known that several factors influence the stability of such solutions. Among such factors are alkalinity or pH of the solution, hypochlorite concentration, temperature of the solution and amount of decomposition catalyst present. It is also known that as little as 1 p.p.m. of $Cu^{++}$ can function as a decomposition catalyst while in the test 10 p.p.m. $Cu^{++}$ were used, a 10 fold increase in the amount necessary to exert its decomposition effect. In addition, the more stable solutions are those of low hypochlorite concentration, having a pH of 11 or higher and kept at low temperature. Since the test solutions had a 5% NaOCl concentration, a pH of 9 and the tests were conducted at 65° C. it can be appreciated that the tests were conducted under accelerated decomposition conditions.

For a more complete understanding of the present invention, reference is made to the following illustrative examples.

Example I

For household dry bleaching the following additives within the ranges specified when incorporated with the chlorine-releasing agent give an effective formulation.

| | |
|---|---|
| Chlorine-releasing agent (chlorinated trisodium phosphate, trichloroisocyanuric acid, dichloroisocyanuric acid, sodium dichloroisocyanurate, potassium dichloroisocyanurate or mixtures of these), (percent available chlorine per total weight of formulation) | 5 to 10 |
| Additives: | Percent by weight |
| Sequestering agent | 1 to 50 |
| Inorganic phosphate (sodium or potassium-tripolyphosphate, -pyrophosphate, -orthophosphate or mixtures of these) | 0 to 50 |
| Inert additive (sodium or potassium-carbonates, -borates, -silicates, -metasilicates, -sulfates, -chlorides or mixtures of these) | 30 to 75 |
| Organic anionic surfactant | 0 to 10 |

The following dry composition (parts by weight) is especially adapted for use as a household dry bleach in an aqueous system at a concentration of about 50 p.p.m. to 100 p.p.m. available chlorine for bleaching and stain removal.

| | |
|---|---|
| Potassium dichloroisocyanurate | 13.0 |
| Sodium tripolyphosphate | 25.0 |
| Tetrasodium methylenediphosphonate | 5.0 |
| Sodium sulfate | 55.0 |
| Sodium dodecyl benzene sulfonate | 2.0 |
| | 100.0 |

Example II

For commercial laundry bleaches the following additives within the ranges specified when incorporated with the chlorine-releasing agent give an effective formulation.

| | |
|---|---|
| Chlorine-releasing agent (chlorinated trisodium phosphate, trichloroisocyanuric acid, dichloroisocyanuric acid, sodium dichloroisocyanurate, potassium dichloroisocyanurate or mixtures of these) (percent available chlorine per total weight of formulation) | 5 to 20 |
| Additives: | Percent by weight |
| Sequestering Agent | 1 to 50 |
| Inorganic phosphate (sodium or potassium-tripolyphosphate, -pyrophosphate, -orthophosphate or mixtures of these) | 0 to 50 |
| Inert additive (sodium or potassium-carbonates, -borates, -silicates, -meta-silicates, -sulfates, -chlorides or mixtures of these) | 30 to 50 |
| Organic anionic surfactant | 0 to 5 |

The following dry composition (parts by weight) is especially adapted for use as a commercial laundry dry bleach when used in an aqueous system at the rate of about 2 ounces per 100 pounds of clothes.

| | |
|---|---|
| Trichloroisocyanuric acid | 17.0 |
| Tetrasodium methylenediphosphonate | 10.0 |
| Tetrasodium pyrophosphate | 35.0 |
| Sodium sulfate | 35.0 |
| Sodium dodecylbenzene sulfonate | 3.0 |
| | 100.0 |

Example III

For scouring cleansers the following additives within the ranges specified when incorporated with a chlorine-releasing agent give an effective formulation.

| | |
|---|---|
| Chlorine-releasing agent (chlorinated trisodium phosphate, trichloroisocyanuric acid, dichloroisocyanuric acid, sodium dichloroisocyanurate, potassium dichloroisocyanurate or mixtures of these) (percent available chlorine per total weight of formulation) | .2 to 1.0 |
| Additives: | Percent by weight |
| Sequestering Agent | 1 to 5 |
| Inorganic phosphate (sodium or potassium-tripolyphosphate, -pyrophosphate, -orthophosphate or mixtures of these) | 0 to 4 |
| Inert additive (sodium or potassium-carbonates, -borates, -silicates, -meta-silicates, -sulfates, -chlorides or mixtures of these) | 0 to 4 |
| Organic anionic surfactant | 1 to 5 |
| Abrasive | 90 to 98 |

The following dry composition (parts by weight) is especially adapted for use as a scouring cleanser when used in minor amounts with water in cleaning kitchen ware and enameled ware.

| | |
|---|---|
| Dichloroisocyanuric acid | 0.7 |
| Tetrasodium methylenediphosphonate | 4.3 |
| Sodium dodecylbenzene sulfonate | 4.0 |
| Silica | 91.0 |
| | 100.0 |

Example IV

For dishwashing compositions, the following additives within the range specified when incorporated with a chlorine-releasing agent give an effective formulation.

| | |
|---|---|
| Chlorine-releasing agent (chlorinated trisodium phosphate, trichloroisocyanuric acid, dichloroisocyanuric acid, sodium dichloroisocyanurate, potassium dichloroisocyanurate or mixtures of these) (percent available chlorine per total weight of formulation) | .5 to 2.0 |
| Additives: | Percent by weight |
| Sequestering Agent | 1 to 40 |
| Inorganic phosphate (sodium or potassium-tripolyphosphate, -pyrophosphate, -orthophosphate or mixtures of these) | 0 to 30 |
| Inert additive (sodium or potassium-carbonates, -borates, -silicates, -meta-silicates, -sulfates, -chlorides or mixtures of these) | 40 to 80 |
| Organic anionic surfactant | 0 to 5 |

The following dry composition (parts by weight) is especially adapted for use as a machine dishwashing compound when used in amounts to give about 15 to 25 p.p.m. available chlorine in the water.

| | |
|---|---|
| Trichlorocyanuric acid | 1.7 |
| Tetrasodium methylenediphosphonate | 15.0 |
| Sodium tripolyphosphate | 15.0 |
| Sodium sulfate | 53.3 |
| Sodium metasilicate | 15.0 |
| | 100.0 |

Example V

For sanitizing compositions the following additives within the range specified when incorporated with a chlorine-releasing agent give an effective formulation.

| | |
|---|---|
| Chlorine-releasing agent (chlorinated trisodium phosphate, trichloroisocyanuric acid, dichloroisocyanuric acid, sodium dichloroisocyanurate, potassium dichloroisocyanurate or mixtures of these) (percent available chlorine per total weight of formulation) | 2 to 20 |

| Additives: | Percent by weight |
|---|---|
| Sequestering Agent | 1 to 40 |
| Inorganic phosphate (sodium or potassium-tripolyphosphate, -pyrophosphate, -orthophosphate or mixtures of these) | 0 to 40 |
| Inert additive (sodium or potassium-carbonates, -borates, -silicates, -meta-silicates, -sulfates, -chlorides or mixtures of these) | 40 to 70 |
| Organic anionic surfactant | 0 to 5 |

The following dry composition (parts by weight) is especially adapted for use as a sanitizing compound for use in an aqueous system for cleaning dairy and food equipment when used in an aqueous system to give about 50 to 100 p.p.m. available chlorine.

| | |
|---|---|
| Trichloroisocyanuric acid | 4.0 |
| Tetrasodium methylenediphosphonate | 15.0 |
| Sodium tripolyphosphate | 15.0 |
| Sodium sulfate | 66.0 |
| | 100.0 |

Example VI

For household liquid bleaching, the following aqueous composition is provided:

| | |
|---|---|
| Chlorine-releasing agent (sodium hypochlorite, calcium hypochlorite, sodium chlorite, lithium hypochlorite or mixtures of these) (percent available chlorine per total weight of composition) | 3 to 7 |

| Additives: | Percent by weight |
|---|---|
| Sequestering agent | 1 to 7 |
| Water | 86 to 96 |

The following liquid composition (parts by weight) is especially adapted for use as a household liquid bleach in hard water at a concentration of about 50 p.p.m. to 100 p.p.m. available chlorine for bleaching and stain removal.

| | |
|---|---|
| Sodium hypochlorite | 5.00 |
| Tetrasodium methylenediphosphonate | 5.00 |
| Water | 90.00 |
| | 100.00 |

What is claimed is:

1. An improved composition consistting essentially of a stable mixture of a chlorine-releasing agent and a sequestering agent selected from the group consisting of the compounds having the formula:

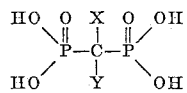

wherein X is selected from the group consisting of hydrogen and lower alkyl groups and Y is selected from the group consisting of hydrogen, hydroxyl and lower alkyl groups, said lower alkyl groups containing from 1 to 4 carbon atoms, and their water soluble salts selected from the group consisting of alkali metal salts, ammonium salts and amine salts selected from the group consisting of aliphatic amines and hydroxy-substituted aliphatic amines having a molecular weight below about 300 and containing not more than 2 amine groups, said chlorine-releasing agent and said sequestering agent being present in proportions of between about 1:50 to about 5,000:1 on a percent available chlorine to weight of sequestering agent basis.

2. The composition of claim 1, wherein said sequestering agent is an alkali metal salt.

3. The composition of claim 2, wherein said sequestering agent is tetrasodium methylenediphosphonate.

4. An aqueous solution consisting essentially of water, a chlorine-releasing agent and a sequestering agent selected from the group consisting of the compounds having the formula:

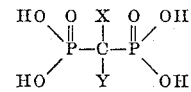

wherein X is selected from the group consisting of hydrogen and lower alkyl groups and Y is selected from the group consisting of hydrogen, hydroxyl, and lower alkyl groups, said lower alkyl groups containing from 1 to 4 carbon atoms, and their water soluble salts selected from the group consisting of alkali metal salts, ammonium salts and amine salts selected from the group consisting of aliphatic amines and hydroxy-substituted aliphatic amines having a molecular weight below about 300 and containing not more than 2 amine groups, said chlorine-releasing agent being present in amount from about 0.001 to .05% available chlorine per weight of aqueous solution and said sequestering agent being present in amounts from about 0.01 to 2% per weight of aqueous solution.

5. The composition of claim 4, wherein said sequestering agent is an alkali metal salt.

6. The composition of claim 5, wherein said sequestering agent is tetrasodium methylenediphosphonate.

7. An aqueous solution of a chlorine-releasing agent stabilized against catalytic decomposition by metallic ions selected from the group consisting of nickel, copper, cobalt, aluminum and iron, consisting essentially of an aqueous solution of said chlorine-releasing agent containing said metallic ions having incorporated therein a sequestering agent selected from the group consisting of compounds having the formula:

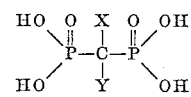

wherein X is selected from the group consisting of hydrogen and lower alkyl groups, Y is selected from the group consisting of hydrogen, hydroxyl and lower alkyl groups, said lower alkyl groups containing from 1 to 4 carbon atoms, and their water soluble salts selected from the group consisting of alkali metal salts, ammonium salts, and amine salts selected from the group consisting of aliphatic amines and hydroxy-substituted aliphatic amines having a molecular weight below about 300 and containing not more than 2 amine groups, said sequestering agent and said metallic ions being between about 1:1 to about 100:1 on a weight ratio basis.

8. The composition of claim 7, wherein said sequestering agent is an alkali metal salt.

9. The composition of claim 8, wherein said sequestering agent is tetrasodium methylenediphosphonate.

10. A dry bleaching and sanitizing composition consisting essentially of:

(1) a chlorine-releasing agent selected from the group consisting of chlorinated trisodium phosphates, trichloroisocyanuric acid, dichloroisocyanuric acid, sodium dichloroisocyanurate, potassium dichloroisocyanurate and mixtures thereof in amounts of between about 2 and about 20% available chlorine per total weight of said composition, (2) a sequestering agent selected from the group consisting of compounds having the formula

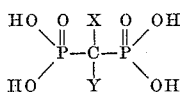

wherein X is selected from the group consisting of hydrogen and lower alkyl groups, and Y is selected from the group consisting of hydrogen, hydroxyl and lower alkyl groups, said lower alkyl groups containing from 1 to 4 carbon atoms, and their alkali metal salts in amounts of between about 1 to about 50% by weight, (3) an inorganic alkali metal phosphate selected from the group consisting of sodium and potassium tripolyphosphates, pyrophosphates, orthophosphates and mixtures thereof in amounts of between 0 to about 50% by weight, (4) an inert alkali metal inorganic salts selected from the group consisting of sodium and potassium carbonates, borates, silicates, metasilicates, sulfates, chlorides and mixtures of these in amounts of between about 30 to about 75% by weight, and (5) a synthetic organic anionic surfactant selected from the group consisting of sodium alkyl benzene sulfonates and sodium alkyl sulfates containing an alkyl group of from about 8 to 22 carbon atoms in amounts of between 0 to about 10% by weight.

11. The dry bleaching composition of claim 10, wherein said sequestering agent is tetrasodium methylenediphosphonate.

12. A scouring cleanser composition consisting essentially of:

(1) a chlorine-releasing agent selected from the group consisting of chlorinated trisodium phosphates, trichloroisocyanuric acid, dichloroisocyanuric acid, sodium dichloroisocyanurate, potassium dichloroisocyanurate and mixtures thereof in amounts of between about .2 to about 1.0% available chlorine per total weight of said composition, (2) a sequestering agent selected from the group consisting of compounds having the formula

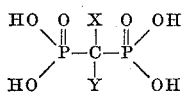

wherein X is selected from the group consisting of hydrogen and lower alkyl groups, and Y is selected from the group consisting of hydrogen, hydroxyl and lower alkyl groups, said lower alkyl groups containing from 1 to 4 carbon atoms, and their alkali metal salts in amounts of between about 1 to about 5% by weight, (3) an inorganic alkali metal phosphate selected from the group consisting of sodium and potassium tripolyphosphates, pyrophosphates, orthophosphates and mixtures thereof in amounts of between 0 to about 4% by weight, (4) an abrasive selected from the group consisting of silica and feldspar in amounts of between about 90 to about 98% by weight, (5) a synthetic organic anionic surfactant selected from the group consisting of sodium alkyl benzene sulfonates and sodium alkyl sulfates containing an alkyl group of from about 8 to 22 carbon atoms in amounts of between about 1 to about 5% by weight, and (6) an alkali metal organic salt selected from the group consisting of sodium and potassium carbonates, borates, silicates, metasilicates, sulfates, chlorides and mixtures of these in amounts of between about 0 to 4% by weight.

13. The scouring cleanser composition of claim 12, wherein said sequestering agent is tetrasodium methylenediphosphonate.

14. A dry dishwashing composition consisting essentially of:

(1) a chlorine-releasing agent selected from the group consisting of chlorinated trisodium phosphates, trichloroisocyanuric acid, dichloroisocyanuric acid, sodium dichloroisocyanurate, potassium dichloroisocyanurate and mixtures thereof in amounts of between about .5 to about 2.0% available chlorine per total weight of said composition, (2) a sequestering agent selected from the group consisting of compounds having the formula

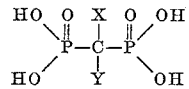

wherein X is selected from the group consisting of hydrogen and lower alkyl groups, and Y is selected from the group consisting of hydrogen, hydroxyl and lower alkyl groups, said lower alkyl groups containing from 1 to 4 carbon atoms, and their alkali metal salts in amounts of between about 1 to about 40% by weight, (3) an inorganic alkali metal phosphate selected from the group consisting of sodium and potassium tripolyphosphates, pyrophosphates, orthophosphates and mixtures thereof in amounts of between 0 to about 30% by weight, (4) an alkali metal inorganic salt selected from the group consisting of sodium and potassium carbonates, borates, silicates, metasilicates, sulfates, chlorides and mixtures of these in amounts of between about 40 to 80% by weight, and.

(5) a synthetic organic anionic surfactant selected from the group consisting of sodium alkyl benzene sulfonates and sodium alkyl sulfates containing an alkyl group of from about 8 to 22 carbon atoms in amounts of between about 0 to about 5% by weight.

15. The dry dishwashing composition of claim 14 wherein said sequestering agent is tetrasodium methylenediphosphonate.

16. A liquid bleaching composition consisting essentially of:

(1) a chlorine-releasing agent selected from the group consisting of sodium hypochlorite, calcium hypochlorite, sodium chlorite, lithium hypochlorite and mixtures thereof, in amounts of between about 3 to 7% available chlorine per total weight of said composition, (2) a sequestering agent selected from the group consisting of compounds having the formula

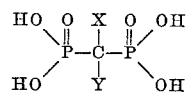

wherein X is selected from the group consisting of hydrogen and lower alkyl groups, and Y is selected from the group consisting of hydrogen, hydroxyl and lower alkyl groups, said lower alkyl groups containing from 1 to 4 carbon atoms, and their alkali metal salts in amounts of between about 1 to about 7% by weight, and (3) water in amounts of between about 86 to 96% by weight.

17. The composition of claim 16, wherein said sequestering agent is tetrasodium methylenediphosphonate.

(References on following page)

15

References Cited by the Examiner

UNITED STATES PATENTS

| | | | |
|---|---|---|---|
| 2,607,738 | 8/1952 | Hardy | 252—99 |
| 2,756,214 | 7/1956 | Albrecht | 252—99 |
| 3,042,622 | 7/1962 | Kirschenbauer | 252—99 |
| 3,058,917 | 10/1962 | Lintner | 252—99 |
| 3,122,417 | 2/1964 | Blazer et al. | 252—99 |
| 3,159,581 | 12/1964 | Diehl | 252—152 |

16

FOREIGN PATENTS

| | | |
|---|---|---|
| 219,930 | 1/1959 | Australia. |
| 1,045,373 | 12/1958 | Germany. |
| 818,714 | 8/1959 | Great Britain. |

SAMUEL H. BLECH, *Primary Examiner.*

JULIUS GREENWALD, *Examiner.*

M. WEINBLATT, *Assistant Examiner.*

---

UNITED STATES PATENT OFFICE
CERTIFICATE OF CORRECTION

Patent No. 3,297,578                            January 10, 1967

Marvin M. Crutchfield et al.

It is hereby certified that error appears in the above numbered patent requiring correction and that the said Letters Patent should read as corrected below.

Column 2, lines 67 to 73, the formula should appear as shown below instead of as in the patent:

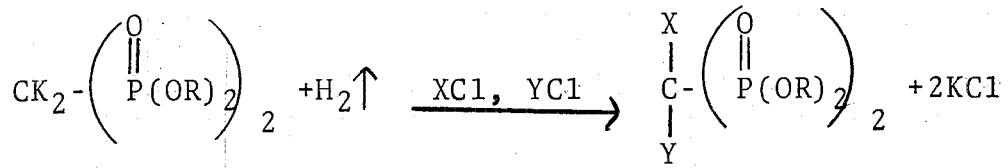

column 7, in TABLE 4, fourth column, line 9 thereof, for "18.5" read -- 18.0 --; column 13, line 75, for "organic" read -- inorganic --.

Signed and sealed this 7th day of November 1967.

(SEAL)
Attest:

EDWARD M. FLETCHER, JR.
Attesting Officer

EDWARD J. BRENNER
Commissioner of Patents

UNITED STATES PATENT OFFICE
CERTIFICATE OF CORRECTION

Patent No. 3,297,578                                January 10, 1967

Marvin M. Crutchfield et al.

It is hereby certified that error appears in the above numbered patent requiring correction and that the said Letters Patent should read as corrected below.

Column 2, lines 67 to 73, the formula should appear as shown below instead of as in the patent:

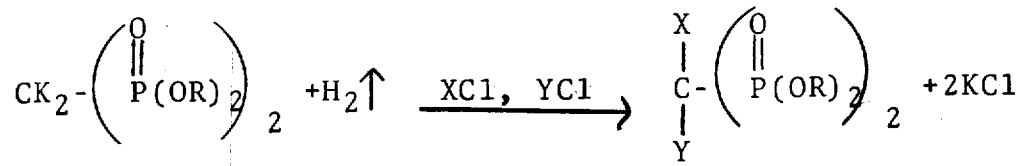

column 7, in TABLE 4, fourth column, line 9 thereof, for "18.5" read -- 18.0 --; column 13, line 75, for "organic" read -- inorganic --.

Signed and sealed this 7th day of November 1967.

(SEAL)
Attest:

EDWARD M. FLETCHER, JR.                      EDWARD J. BRENNER
Attesting Officer                              Commissioner of Patents